United States Patent [19]

Morikawa et al.

[11] Patent Number: 4,659,632

[45] Date of Patent: Apr. 21, 1987

[54] COBALT ALLOY FOR BUILD-UP WELDING HAVING IMPROVED RESISTANCE TO WELD CRACK

[75] Inventors: Masaki Morikawa, Iwatsuki; Junya Ohe, Urawa; Akifumi Mishima; Sadao Saitoh, both of Omiya, all of Japan

[73] Assignee: Mitsubishi Kinzoku Kabushiki Kaisha, Tokyo, Japan

[21] Appl. No.: 679,467

[22] Filed: Dec. 7, 1984

Related U.S. Application Data

[62] Division of Ser. No. 477,136, Mar. 21, 1983, abandoned.

[30] Foreign Application Priority Data

Apr. 7, 1982 [JP] Japan .................................. 57-57904

[51] Int. Cl.[4] ............................................... B32B 15/01

[52] U.S. Cl. ..................................... 428/679; 420/440

[58] Field of Search ................ 428/668, 679; 420/440

[56] References Cited

U.S. PATENT DOCUMENTS 3,237,441 3/1966 Eberle ................................ 420/440

*Primary Examiner*—R. Dean

*Attorney, Agent, or Firm*—Frishauf, Holtz, Goodman & Woodward

[57] ABSTRACT

A composite article comprising a metal substrate having a cobalt-base alloy built-up surface portion consisting essentially of a cobalt-base alloy welding metal which has been deposited on said substrate by an overlay welding process using a cobalt-base welding metal which consists essentially of 1.1 to 3.0% Si, 0.2 to 0.5% C, 25.0 to 30.0% Cr, 0.1 to 1.0% W, 0.2 to 3.0% Fe, 0.4 to 6.0% Mo, 0.1 to 2.0% MN, 1.0 to 4.0% Ni, the balance being Co and incidental impurities, the percentage being on a weight basis. The built-up surface portion has high resistance to wear and to weld cracking.

18 Claims, No Drawings

COBALT ALLOY FOR BUILD-UP WELDING HAVING IMPROVED RESISTANCE TO WELD CRACK

This is a division of application Ser. No. 477,136 filed Mar. 21, 1983, abandoned.

BACKGROUND OF THE INVENTION

1. Field of the Invention

The present invention relates to a Co-base alloy that can be used in overlay welding to form hard beads having high resistance to wear and weld cracks.

2. Description of the Prior Art

In the manufacture of pumps and valves, those parts which are required to have high wear resistance are joined together by overlay welding of a hardfacing alloy. Typical alloys conventionally used for this purpose are a Co-base alloy consisting essentially of 2% Ni, 30% Cr, 12% W, 2% Fe, 2.5% C, with the balance being Co, and a Co-base alloy consisting essentially of 2.5% Ni, 28% Cr, 4% W, 4% Mo, 2% Fe, 1.0% C, with the balance being Co, the percentage being on a weight basis. However, during welding operations, microfissures often develop in a bead due to B, P and S elements that are contained in the alloy as incidental impurities, and the manufacturer tacitly accepts the cracks because the weld bead has one great advantage, high wear resistance. Recently, a proposal has been made that these hard Co-base alloys with their high wear resistance be used as a weld metal in the overlay welding of parts of nuclear power generators, and when they are used for this purpose, the slightest crack is fatal and must be avoided by all means.

SUMMARY OF THE INVENTION

The present inventors have made various studies to attain an alloy that can be used in overlay welding to produce a bead free from weld cracks and having wear resistance as high as that of the conventional hard Co-alloy for overlay welding and have come up with a Co-base alloy consisting essentially of 1.1 to 3.0% Si, 0.2 to 0.5% C, 25.0 to 30.0% Cr, 0.1 to 1.0% W, 0.2 to 3.0% Fe, 0.4 to 6.0% Mo, 0.1 to 2.0% Mn, 1.0 to 4.0% Ni, with the balance being Co and incidental impurities (the percentage being on a weight basis). Even when this alloy contains about 0.007% B, 0.01% P and 0.02% S as impurities, it can be used in overlay welding to form beads which are free from cracks, particularly microfissures usually found between beads, and which are remarkably hard and exhibit high wear resistance.

DETAILED DESCRIPTION OF THE INVENTION

The criticality of the amounts of the respective components of the Co-base alloy of the present invention is described below.

(a) Si

The Si component confines microfissures developed during overlay welding and thus will inhibit the cracks from affecting the weld bead. Silicon has a deoxidizing effect, and in addition, improves the castability of a welding material. If the Si content is less than 1.1%, the desired resistance to weld cracks is not assured, and if the Si content exceeds 3.0%, the weld bead becomes too hard to be machined by cutting or grinding. Therefore, silicon is contained in the Co-base alloy of the present invention in an amount of from 1.1 to 3.0%.

(b) C

The C component is bound with Cr. W and Mo to form respective carbides, thus improving the hot and cold hardness and wear resistance of the weld bead. If the carbon content is less than 0.2%, a weld bead having the desired wear resistance is not produced, and if the content exceeds 0.5%, the resistance to thermal shock is reduced. Therefore, the carbon content of the Co-base alloy of the present invention is limited to a 0.2 to 0.5% range.

(c) Cr

The Cr component dissolve in the matrix of the Co-base alloy and increases its strength and hot hardness. In addition, chromium is bound with carbon to form a carbide which contributes to increasing the wear resistance of the weld bead. If the Cr content is less than 25.0%, a weld bead having the desired properties is not produced, and if the content exceeds 30.0%, the ductility of the weld bead is greatly decreased. Therefore, chromium is contained in the Co-base alloy of the present invention in an amount of from 25.0 to 30.0%.

(d) Mn

The Mn component has deoxidizing and desulfurizing effects, as well as the ability to improve overlay weldability. If the Mn content is less than 0.1%, these desired properties are not attained, and if the content exceeds 2.0%, much slag is formed during welding, making it impossible to produce a sound weld bead. Therefore, manganese is contained in the Co-base alloy of the present invention in an amount of from 0.1 to 2.0%.

(e) W

The W component, like Cr, dissolves in the matrix of the Co-base alloy and increases its strength and forms a carbide to thereby increase the hot strength and hardness of the weld bead. If the W content is less than 0.1%, these properties are not achieved and if the content exceeds 1.0%, the machinability of the weld bead is decreased. Therefore, tungsten is contained in the Co-base alloy of the present invention in an amount of from 0.1 to 1.0%.

(f) Fe

The Fe component is effective in forming a weld bead having increased resistance to thermal shock. The minimum amount for attaining the desired resistance to thermal shock is 0.2%, but if the Fe content exceeds 3.0%, the wear resistance of the weld bead is reduced. Therefore, iron is contained in the Co-base alloy of the present invention in an amount of from 0.1 to 3.0%.

(g) Mo

The Mo component, like Cr and W, is bound with carbon to form a carbide that provides increased hot hardness. If the Mo content is less than 0.4%, the desired hot hardness is not assured, and if the content exceeds 6.0%, the toughness of the weld bead is decreased. Therefore, molybdenum is contained in the Co-base alloy of the present invention in an amount of from 0.4 to 6.0%.

(h) Ni

The Ni component is effective in forming a weld bead having increased resistance to thermal shock. If the Ni content is less than 1.0%, the desired resistance to thermal shock is not assured, and if the content exceeds 4.0%, the fluidity of the weld metal is decreased as to impede smooth welding operation. Therefore, nickel is contained in the Co-base alloy of the present invention in an amount of from 1.0 to 4.0%.

The Co-base alloy for overlay welding of the present invention is now described in greater detail by reference to the following non-limiting example.

EXAMPLE

Samples of molten alloy having the compositions indicated in Table 1 were prepared by the conventional melting technique. Welding rods Nos. 1 to 17 (made of the Co-base alloy of the present invention) and Nos. 1 to 8 (comparative Co-base alloy) each having a diameter of 4.8 mm were cast from the respective alloy samples by vacuum drawing. In welding rods 1 to 8, one of their components indicated by an asterisk in Table 1 was outside the range specified in the present invention.

Using the welding rods, two layers were deposited on mild steel plates (25 mm×65 mm×200 mm) by TIG manual overlay welding at a welding current of 230–240 A and an inter-layer temperature of 200° C. or less. At each pass, a weld bead 25 mm wide was formed. No preheating was effected. The resulting weld beads were checked for cracks by dye penetrant inspection. The criteria were: O for no weld crack, Δ for the presence of cracks only in craters, X for the presence of cracks throughout the bead surface.

The upper layer of the bead of each sample was removed, and the lower layer was subjected to an abrasion test with an Ohgoshi abrasion testing machine wherein a JIS SUJ-2 steel plate (hardness: $H_RC$-60) was abraded against the lower layer at a speed of 0.1 m/sec at ambient temperature in a dry state under a load of 18.2 kg. The data of the resulting wear with the value 1.00 taken as the reference is listed in Table 1.

The respective beads were subjected to a cutting performance test wherein the time necessary for boring three holes 10 mm deep in the beads with a cemented carbide drill (2.5 mmφ) was measured, with the value 100 seconds taken as the reference. The results are shown in Table 1, which also gives data on the hardness of the surface of the beads on a Rockwell C scale.

As the table shows, welding rods Nos. 1 to 17 of the present invention which contained B, P and S impurities that would cause fine weld cracks produced weld beads that were entirely free from weld cracks and which had high wear resistance and machinability. In contrast, control welding rods Nos. 1 to 8 wherein one of their components was outside the range specified in the present invention produced beads which were inferior to those formed by the rods of the present invention with respect to at least one of the welding properties, i.e. resistance to weld cracks, resistance to wear and machinability.

As described above, the Co-base alloy of the present invention can be used in overlay welding and forms a weld bead having no microscopic, still less macroscopic, cracks. The bead produced has high resistance to wear and thermal shock, as well as high machinability.

TABLE 1

| Welding rod sample No. | alloying elements (Wt %) Si | C | Cr | W | Fe | Mo | Mn | Ni | B | P | S | Co | Welding cracks | relative wear ($\times 10^{-7}$ kg/mm$^2$) | time to bore holes (sec) | hardness ($H_RC$) |
|---|---|---|---|---|---|---|---|---|---|---|---|---|---|---|---|---|
| | | | | | | | samples of the present invention | | | | | | | | | |
| 1 | 1.11 | 0.24 | 28.0 | 0.30 | 0.55 | 0.81 | 0.78 | 2.01 | 0.007 | 0.013 | 0.021 | bal. | O | 0.95 | 86 | 25 |
| 2 | 2.03 | 0.39 | 28.0 | 0.30 | 0.56 | 0.72 | 0.71 | 2.01 | 0.007 | 0.013 | 0.022 | bal. | O | 0.90 | 89 | 27 |
| 3 | 2.98 | 0.41 | 28.1 | 0.30 | 0.58 | 0.70 | 0.70 | 2.02 | 0.007 | 0.012 | 0.023 | bal. | O | 0.85 | 95 | 29 |
| 4 | 1.30 | 0.21 | 28.3 | 0.52 | 0.92 | 1.02 | 1.02 | 2.00 | 0.005 | 0.013 | 0.019 | bal. | O | 0.95 | 85 | 25 |
| 5 | 1.30 | 0.49 | 28.3 | 0.51 | 0.91 | 1.01 | 1.50 | 2.03 | 0.004 | 0.015 | 0.019 | bal. | O | 0.85 | 94 | 29 |
| 6 | 1.11 | 0.24 | 25.1 | 0.51 | 1.02 | 2.01 | 1.30 | 2.02 | 0.007 | 0.013 | 0.018 | bal. | O | 1.00 | 80 | 23 |
| 7 | 1.21 | 0.30 | 29.7 | 0.53 | 0.81 | 2.00 | 1.31 | 2.02 | 0.007 | 0.014 | 0.021 | bal. | O | 0.85 | 95 | 29 |
| 8 | 1.33 | 0.31 | 28.1 | 0.12 | 1.02 | 2.31 | 0.82 | 2.31 | 0.007 | 0.015 | 0.021 | bal. | O | 0.85 | 96 | 29 |
| 9 | 1.33 | 0.31 | 28.5 | 0.99 | 1.51 | 2.51 | 0.71 | 2.30 | 0.007 | 0.013 | 0.023 | bal. | O | 0.85 | 95 | 29 |
| 10 | 1.50 | 0.29 | 28.1 | 0.33 | 0.21 | 2.50 | 0.60 | 2.30 | 0.007 | 0.010 | 0.021 | bal. | O | 0.95 | 84 | 25 |
| 11 | 1.50 | 0.30 | 28.3 | 0.41 | 2.96 | 3.02 | 0.52 | 2.41 | 0.004 | 0.013 | 0.022 | bal. | O | 0.95 | 85 | 25 |
| 12 | 1.50 | 0.31 | 28.3 | 0.30 | 1.01 | 0.42 | 0.31 | 2.41 | 0.005 | 0.012 | 0.023 | bal. | O | 0.95 | 84 | 25 |
| 13 | 1.50 | 0.29 | 28.3 | 0.45 | 1.01 | 5.95 | 0.50 | 2.50 | 0.005 | 0.015 | 0.022 | bal. | O | 0.85 | 93 | 29 |
| 14 | 1.50 | 0.25 | 28.1 | 0.44 | 1.02 | 3.02 | 0.12 | 2.62 | 0.005 | 0.013 | 0.021 | bal. | O | 0.95 | 86 | 25 |
| 15 | 1.11 | 0.29 | 28.1 | 0.45 | 0.80 | 3.01 | 1.98 | 2.71 | 0.007 | 0.011 | 0.021 | bal. | O | 0.95 | 83 | 25 |
| 16 | 1.11 | 0.35 | 28.1 | 0.55 | 1.11 | 3.51 | 1.30 | 1.12 | 0.007 | 0.011 | 0.022 | bal. | O | 0.90 | 88 | 27 |
| 17 | 1.20 | 0.39 | 28.1 | 0.51 | 1.80 | 2.82 | 1.52 | 3.96 | 0.005 | 0.011 | 0.021 | bal. | O | 0.95 | 85 | 25 |
| | | | | | | | Comparative Samples | | | | | | | | | |
| 1 | 0.51* | 0.24 | 28.1 | 0.51 | 0.55 | 0.92 | 0.77 | 2.01 | 0.007 | 0.012 | 0.021 | bal. | X | 1.10 | 81 | 22 |
| 2 | 0.96* | 0.24 | 28.3 | 0.52 | 0.55 | 0.93 | 0.77 | 2.32 | 0.007 | 0.013 | 0.022 | bal. | Δ | 0.92 | 99 | 27 |
| 3 | 3.22* | 0.24 | 28.3 | 0.62 | 0.55 | 1.01 | 0.77 | 2.40 | 0.006 | 0.010 | 0.020 | bal. | O | 0.85 | 115 | 29 |
| 4 | 1.35 | 0.17* | 28.1 | 0.61 | 0.55 | 1.00 | 0.77 | 2.23 | 0.006 | 0.011 | 0.021 | bal. | O | 1.20 | 79 | 21 |
| 5 | 1.53 | 0.25 | 23.5* | 0.60 | 0.53 | 1.03 | 0.73 | 2.30 | 0.007 | 0.011 | 0.021 | bal. | O | 1.21 | 79 | 21 |
| 6 | 1.31 | 0.30 | 28.2 | 0.06* | 0.53 | 1.21 | 0.74 | 2.01 | 0.007 | 0.011 | 0.020 | bal. | O | 1.22 | 80 | 21 |
| 7 | 1.52 | 0.30 | 28.2 | 1.13* | 0.60 | 1.22 | 0.77 | 2.01 | 0.006 | 0.015 | 0.020 | bal. | O | 0.80 | 130 | 30 |
| 8 | 1.60 | 0.32 | 28.3 | 0.52 | 0.60 | 0.34* | 0.77 | 2.03 | 0.007 | 0.010 | 0.020 | bal. | O | 1.13 | 83 | 22 |

What is claimed is:

1. A composite article comprising a metal substrate having a cobalt-base alloy built-up surface portion consisting essentially of a cobalt-base alloy welding metal which has been deposited on said substrate by an overlay welding process using a cobalt-base welding metal which consists essentially of 1.1 to 3.0% Si, 0.2 to 0.5% C, 25.0 to 30.0% Cr, 0.1 to 1.0% W, 0.2 to 3.0% Fe, 0.4 to 6.0% Mo, 0.1 to 2.0% Mn, 1.0 to 4.0% Ni, the balance being Co and incidental impurities, the percentage being on a weight basis, said built-up surface portion having high resistance to wear and to weld cracking.

2. The composite article of claim 1 which consists essentially of 1.11% Si, 0.24% C, 28.0% Cr, 0.30% W, 0.55% Fe, 0.81% Mo, 0.78% Mn, 2.01% Ni, the balance being Co and incidental impurities.

3. The composite article of claim 1 which consists essentially of 2.03% Si, 0.39% C, 28.0% Cr, 0.30% W, 0.56% Fe, 0.72% Mo, 0.71% Mn, 2.01% Ni, the balance being Co and incidental impurities.

4. The composite article of claim 1 which consists essentially of 2.98% Si, 0.41% C, 28.1% Cr, 0.30% W, 0.58% Fe, 0.70% Mo, 0.70% Mn, 2.02% Ni, the balance being Co and incidental impurities.

5. The composite article of claim 1 which consists essentially of 1.30% Si, 0.21% C, 28.3% Cr, 0.52% W, 0.92% Fe, 1.02% Mo, 1.02% Mn, 2.00% Ni, the balance being Co and incidental impurities.

6. The composite article of claim 1 which consists essentially of 1.30% Si, 0.49% C, 28.3% Cr, 0.51% W, 0.91% Fe, 1.01% Mo, 1.50% Mn, 2.03% Ni, the balance being Co and incidental impurities.

7. The composite article of claim 1 which consists essentially of 1.11% Si, 0.24% C, 25.1% Cr, 0.51% W, 1.02% Fe, 2.01% Mo, 1.30% Mn, 2.02% Ni, the balance being Co and incidental impurities.

8. The composite article of claim 1 which consists essentially of 1.21% Si, 0.30% C, 29.7% Cr, 0.53% W, 0.81% Fe, 2.00% Mo, 1.31% Mn, 2.02% Ni, the balance being Co and incidental impurities.

9. The composite article of claim 1 which consists essentially of 1.33% Si, 0.31% C, 28.1% Cr, 0.12% W, 1.02% Fe, 2.31% Mo, 0.82% Mn, 2.31% Ni, the balance being Co and incidental impurities.

10. The composite article of claim 1 which consists essentially of 1.33% Si, 0.31% C, 28.5% Cr, 0.99% W, 1.51% Fe, 2.51% Mo, 0.71% Mn, 2.30% Ni, the balance being Co and incidental impurities.

11. The composite article of claim 1 which consists essentially of 1.50% Si, 0.29% C, 28.1% Cr, 0.33% W, 0.21% Fe, 2.50% Mo, 0.60% Mn, 2.30% Ni, the balance being Co and incidental impurities.

12. The composite article of claim 1 which consists essentially of 1.50% Si, 0.30% C, 28.3% Cr, 0.41% W, 2.96% Fe, 3.02% Mo, 0.52% Mn, 2.41% Ni, the balance being Co and incidental impurities.

13. The composite article of claim 1 which consists essentially of 1.50% Si, 0.31% C, 28.3% Cr, 0.30% W, 1.01% Fe, 0.42% Mo, 0.31% Mn, 2.41% Ni, the balance being Co and incidental impurities.

14. The composite article of claim 1 which consists essentially of 1.50% Si, 0.29% C, 28.3% Cr, 0.45% W, 1.01% Fe, 5.95% Mo, 0.50% Mn, 2.50% Ni, the balance being Co and incidental impurities.

15. The composite article of claim 1 which consists essentially of 1.50% Si, 0.25% C, 28.1% Cr, 0.44% W, 1.02% Fe, 3.02% Mo, 0.12% Mn, 2.62% Ni, the balance being Co and incidental impurities.

16. The composite article of claim 1 which consists essentially of 1.11% Si, 0.29% C, 28.1% Cr, 0.45% W, 0.80% Fe, 3.01% Mo, 1.98% Mn, 2.71% Ni, the balance being Co and incidental impurities.

17. The composite article of claim 1 which consists essentially of 1.11% Si, 0.35% C, 28.1% Cr, 0.55% W, 1.11% Fe, 3.51% Mo, 1.30% Mn, 1.12% Ni, the balance being Co and incidental impurities.

18. The composite article of claim 1 which consists essentially of 1.20% Si, 0.39% C, 28.1% Cr, 0.51% W, 1.80% Fe, 2.82% Mo, 1.52% Mn, 3.96% Ni, the balance being Co and incidental impurities.

* * * * *

UNITED STATES PATENT AND TRADEMARK OFFICE
CERTIFICATE OF CORRECTION

PATENT NO. : 4,659,632

DATED : April 21, 1987

INVENTOR(S) : MORIKAWA et al

It is certified that error appears in the above-identified patent and that said Letters Patent is hereby corrected as shown below:

TITLE PAGE:

Change the title "COBALT ALLOY FOR BUILD-UP WELDING HAVING IMPROVED RESISTANCE TO WELD CRACK" to --COMPOSITE COMPRISING A METAL SUBSTRATE HAVING AN OVERLAY WELDED SURFACE FORMED FROM A COBALT-BASED ALLOY--.

Signed and Sealed this

Twelfth Day of January, 1993

*Attest:*

DOUGLAS B. COMER

*Attesting Officer*

*Acting Commissioner of Patents and Trademarks*